Patented Mar. 5, 1935

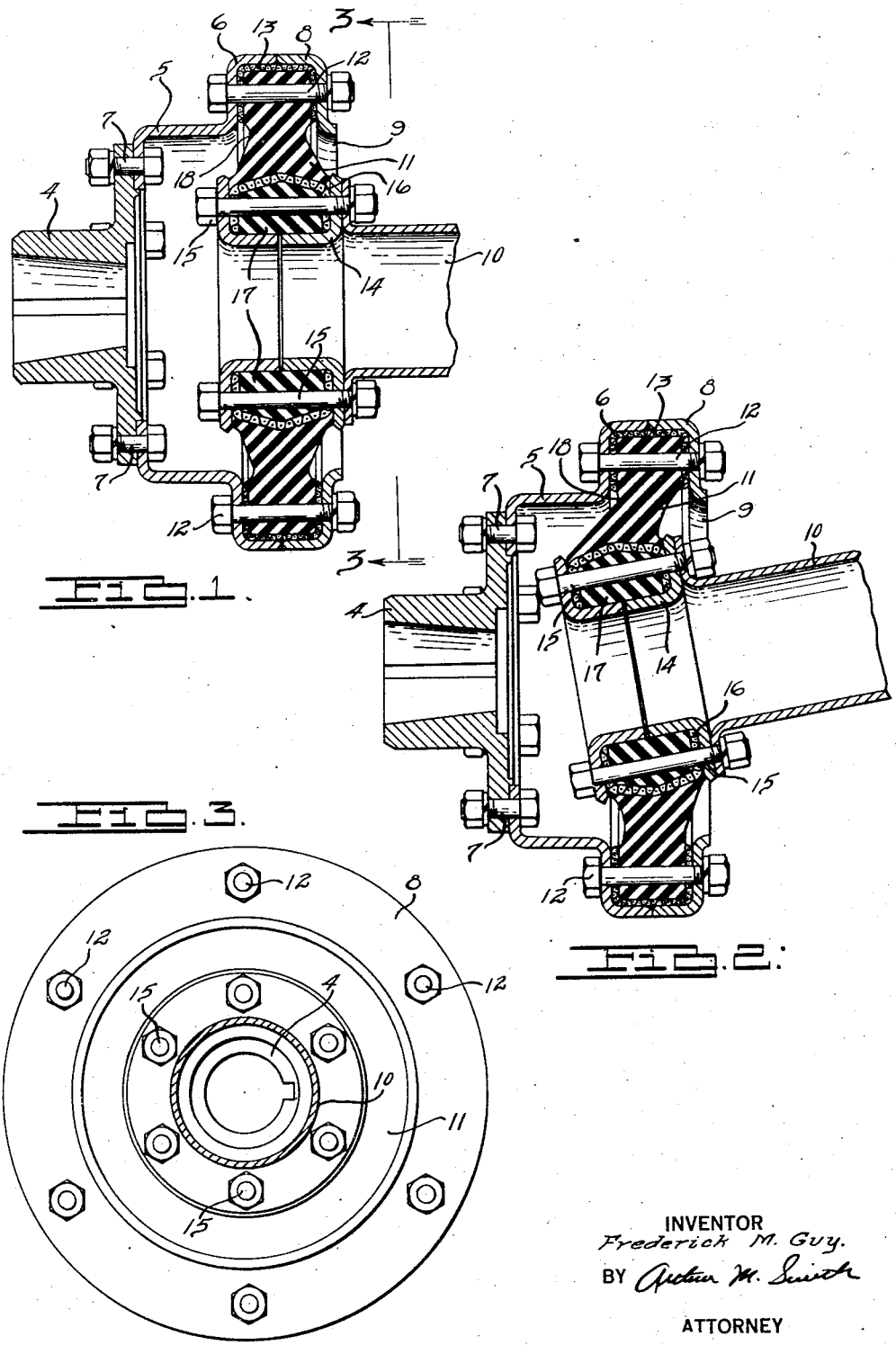

1,993,094

UNITED STATES PATENT OFFICE 1,993,094

UNIVERSAL JOINT

Frederick M. Guy, Detroit, Mich., assignor to Guy and Murton, Incorporated, Detroit, Mich., a corporation of Michigan Application August 21, 1931, Serial No. 558,541

2 Claims. (Cl. 64—96)

My invention relates to a universal joint and particularly to a universal joint in which the sole driving connection between the driving and driven shafts is through a resilient element which, by changes in its form, accommodates the angular, parallel and longitudinal misalignments between the shafts.

Universal joints embodying resilient elements as the sole driving connection between the driving and driven shafts have heretofore been proposed but no provision has been made heretofore for so working the resilient element as to eliminate excessive wear on the element during the operation of the joint.

Where rubber or a rubberized fabric or the like is used as the resilient element, scuffing and wear between the resilient element and the metallic parts of the structure will result, unless such resilient element is so held as to prevent all relative movement between the resilient element and the holding means.

Likewise, it has been found that the use of rubber as a resilient element in such a joint is practical only if the rubber is not worked to an excessive degree under a tension strain. Universal joints with which I am familiar which have proposed to use rubber or the like as a resilient medium have not heretofore worked the resilient medium except under a tension strain.

Likewise, the resilient element must contain a sufficient quantity of rubber or the like and it must be so disposed about the connected parts that localized strains in the resilient medium are dissipated to such an extent that substantially the whole body of the resilient medium is subjected to the working strains incident to the transmission of power to the misaligned shafts through the joint.

It is, therefore, an object of my present invention to provide a universal joint in which the sole driving connection between the driving and driven shafts is through a resilient medium which is so held as to permit angular, parallel, and longitudinal misalignment of the shafts by changes in form of the resilient element.

It is a further object of my present invention to provide a universal joint in which a resilient element provides the sole driving connection between the driving and driven shafts, and in which the resilient element is so held as to eliminate any relative movement between the surfaces of the resilient element and the surfaces of the members holding the resilient element in the joint.

It is a furthr object of my present invention to provide a universal joint in which a resilient element provides the sole driving connection between the driving and driven shafts, and in which the quantity of material in the resilient element is so disposed in the resilient element that working in the resilient element is distributed over a relatively large portion of the resilient element, thus eliminating the strains due to localized working.

It is another object of my present invention to provide a universal joint in which the sole driving connection between the driving and driven shafts is through a resilient element which is so disposed and held in the joint that working in the resilient element may take place without subjecting the element to continuous tension strains during the time that it is being so worked.

These, and various other objects, features of arrangement, construction, and operation, are plainly shown and described and will be best understood by reference to the accompanying drawing showing a preferred embodiment of my invention, in which Fig. 1 is a side elevational view in cross section of a universal joint embodying my invention showing the position of the parts where the driving and driven shafts are in alignment;

Fig. 2 is a cross sectional view in side elevation showing the parts of a universal joint embodying my invention in the position occupied by the parts when connecting two shafts which are angularly and longitudinally misaligned;

Fig. 3 is a plan view taken on the line 3—3 of Fig. 1.

Similar reference numerals refer to similar parts throughout the several views.

Referring more in detail to the drawing, 4 designates a flanged hub adapted for attachment to the driving shaft. Secured to the flanged hub 4 is an annular extending flange member 5 terminating in a pocket portion 6. A flange 5 is secured to the hub 4 by bolts or similar means 7. An annular member 8 of the same size as the portion 6 of the member 5 has an open central portion 9 through which the driven shaft 10 is permitted to extend.

Secured between the member 5 and the member 8 is a resilient element 11 securely clamped between the member 5 and the member 8 by means of a plurality of bolts or similar means 12. Extending around the outer circumference of the resilient element 11 is a protective covering 13 constructed of fabric or the like and vulcanized to the resilient element 11. The resilient element 11 is formed with a central opening in which is secured a central member 14, to which the driven shaft 10 is secured by a plurality of bolts or similar means 15. The member 14 is formed of two separate pieces, which are drawn together by the bolts 15, as shown in Fig. 1.

The resilient element 11 is provided with an annular U-shaped protective member 16, which extends around the central opening in the resilient element 11 and contacts with the member 14. Inside of the U-shaped protective member 16 is bonded a spacing element 17 formed of some elastic medium such as rubber or the like.

In the assembling of a universal joint embodying my invention it is apparent that a large number of stampings may be used, the members 5, 8 and 14 being formed entirely of stampings of proper size and thickness and definitely held in their relative locations by the bolts 12 and 15 passing through the resilient member 11. The provision of the protective members 13 and 16 prevent scuffing of the resilient element 11 by movement between the metal parts 5, 8 and 9 and the resilient element 11.

In a preferred embodiment of my invention I have constructed the resilient element 11 of rubber or the like of a sufficient amount and of proper quality to stand the strains to which it is subjected without being permanently deformed or being subjected to excessive wear.

In the construction of the resilient member 11 the groove 18 has been developed in both faces of the resilient element 11 in order to provide a substantially uniform amount of rubber at all points subjected to working strains. Thus, the number of cubic inches of rubber in the element 11 on a circumference just outside of the member 14 is substantially the same as the amount of rubber on a circumference taken through the point of greatest depth of the groove 18. By this means it is possible to secure a uniform working in the resilient element 11 and thus eliminate the localized working strains which otherwise would result in a rapid deterioration of the element 11.

The elastic spacing element 17 in the preferred embodiment of my invention is preferably constructed of a harder grade of rubber than that used in the resilient element 11. By so constructing the resilient element 11 that the portion of the member 11 adjacent the inner opening is wider than the opening between the members 14, and also constructing the protective element 16 of a slightly larger size than that which would normally occupy the space in the member 14, I have found that it is possible to build up an initial compression in the resilient element 11 by the clamping effect on the member 17 and the protective covering 16, which in turn is transmitted to the resilient element 11. Likewise, the resilient element 11 adjacent the protective member 13 and the protective member 13 may be thicker than the pocket formed by the member 8 and the member 5, so that when the resilient element 11 is secured between the member 5 and the member 8 by the bolts 12, a clamping effect is exerted on the protective covering 13 and the compression resulting from the clamping is passed into the body of the rubber forming the resilient element 11. By this means, when a joint embodying my invention is initially assembled, the rubber forming the resilient element 11 is already in a state of initial compression. By this means it is possible to distort the rubber 11 in order to accommodate angular, parallel, or longitudinal misalignment between the shafts without setting up a tension strain in the rubber, inasmuch as a certain amount of movement is permitted by the rubber and is accommodated solely by relieving the compression theretofore built up in the rubber by the clamping of the rubber in the members, as above described.

The protective members 13 and 16 may be of any material to which the rubber forming the resilient element 11 may be bonded, and should be preferably of a material having a lesser coefficient of friction than the rubber forming the resilient element 11. In the preferred construction of my invention I have used a wire cloth to which the rubber is bonded, and believe this to be the most satisfactory type of material to use for this purpose, although fabric or the like may be used.

As shown in Fig. 2, the angular and longitudinal misalignments of the driving and driven shafts are accommodated by distortion of the resilient element 11, as there shown. By this means it is possible to provide a universal joint of this type which may be used in motor vehicle or similar construction in which the driving and driven shafts are subjected to relative longitudinal misalignments without the provision of a spline section or the like in the shafts for accommodating the movement between the driving and driven shafts by a mechanical slippage of some kind. This feature is particularly important in present day motor vehicle construction in which the floating rear axle and Hotchkiss type of drive are used. In such construction there is a longitudinal misalignment of the shafts, which is accompanied by an end thrust transmitted from the rear axle into the propeller shaft. The relative longitudinal misalignments between the propeller shaft and the rear axle, and between the propeller shaft and the transmission, must be accommodated in some manner, the present conventional manner being the use of a mechanical spline. A universal joint such as I have here shown and described embodying my invention may be used in this type of motor vehicle construction and will eliminate the necessity for such spline sections because of the action of the resilient member 11 in accommodating the longitudinal misalignment of the shafts.

In many installations in which universal joints of this type are used it is highly desirable that some limitation be made on the amount of misalignment to which the joint is subjected in order that the joint will not be subjected to misalignments in excess of those for which it was constructed. In a universal joint embodying my invention this is definitely limited by the depth of the member 5 and the clearance between the ends of the bolts or similar means 15 and the end of the member 5, and is also controlled by the size of the opening 9 in the member 8.

While I have illustrated a preferred embodiment of my invention, many modifications may be made without departing from the spirit of the invention, and I do not wish to be limited to precise details of construction as herein set forth, but desire to avail myself of all changes within the scope of the appended claims.

Having thus described my invention, what I claim is new and desire to secure by Letters Patent of the United States is:

1. A universal joint for connecting two shaft ends to rotate one of said shaft ends from the other and to provide for angular, parallel and longitudinal displacement of said shaft ends, said universal joint including a carrier secured to one shaft end and extending outwardly radially therefrom, bead clamping means concentric with said shaft on said carrier, the second shaft end having an outwardly flanged portion, a bead clamping member secured to said outwardly flanged portion, an annular resilient rubber member having inner and outer beads secured to said respective bead clamps and forming the sole driving connection between said shaft ends, grooves in the opposite faces of said resilient rubber member whereby the cubical content of resilient rubber disposed between said beads is substantially uniform at all points where working occurs, and flexible means adjacent said beads on said resilient rubber member for protecting the beads on said resilient rubber member from wear due to surface friction.

2. A universal joint for connecting two shaft ends to rotate one of said shaft ends from the other and to provide for angular, parallel and longitudinal displacement of said shaft ends, said universal joint including a carrier secured to one shaft end and extending outwardly radially therefrom, bead clamping means concentric with said shaft on said carrier, the second shaft end having an outwardly flanged portion, a bead clamping member secured to said outwardly flanged portion, an annular resilient member having inner and outer beads secured to said respective bead clamps and forming the sole driving connection between said shaft ends, grooves in the opposite faces of said resilient member whereby the cubical content of resilient material disposed between said beads is substantially uniform at all points where working occurs, and flexible means adjacent said beads on said resilient member for protecting the beads on said resilient member from excessive wear and including members of less resilient material than said annular resilient member, said members being interposed between the beads on said resilient member and the bead clamping means carried by said shafts.

FREDERICK M. GUY.